US009473994B2

(12) United States Patent
Oprescu-Surcobe et al.

(10) Patent No.: US 9,473,994 B2
(45) Date of Patent: Oct. 18, 2016

(54) METHOD AND SYSTEM FOR SELECTING A TARGET CELL FOR HANDOVER OF USER EQUIPMENT IN A LONG TERM EVOLUTION SYSTEM

(75) Inventors: Valentin Oprescu-Surcobe, Northbrook, IL (US); Peter M. Drozt, Prairie Grove, IL (US); Michael F. Korus, Eden Prairie, MN (US); Donald G. Newberg, Hoffman Estates, IL (US); Aparna Pandey, Chicago, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 1370 days.

(21) Appl. No.: 12/981,985

(22) Filed: Dec. 30, 2010

(65) Prior Publication Data
US 2012/0170547 A1 Jul. 5, 2012

(51) Int. Cl.
*H04W 36/00* (2009.01)
*H04W 4/06* (2009.01)

(52) U.S. Cl.
CPC ........... *H04W 36/0083* (2013.01); *H04W 4/06* (2013.01); *H04W 36/0094* (2013.01)

(58) Field of Classification Search
CPC ................... H04W 36/0083; H04W 36/0094; H04W 4/06
USPC ....... 370/241, 252, 310, 328, 329, 331, 332, 370/333; 455/403, 422.1, 436, 437, 438, 455/442
See application file for complete search history.

(56) References Cited

U.S. PATENT DOCUMENTS

| | | | |
|---|---|---|---|
| 5,946,612 A * | 8/1999 | Johansson | 455/405 |
| 6,038,449 A | 3/2000 | Corriveau et al. | |
| 6,400,951 B1 * | 6/2002 | Vaara | 455/436 |
| 7,260,074 B2 | 8/2007 | Vare | |
| 7,929,970 B1 * | 4/2011 | Gunasekara et al. | 455/444 |
| 2003/0236827 A1 | 12/2003 | Patel et al. | |
| 2005/0111430 A1 * | 5/2005 | Spear et al. | 370/345 |
| 2005/0282571 A1 | 12/2005 | Oprescu-Surcobe et al. | |
| 2006/0025151 A1 | 2/2006 | Karaoguz et al. | |
| 2006/0252430 A1 | 11/2006 | Barreto et al. | |
| 2006/0252439 A1 | 11/2006 | Cai | |

(Continued)

FOREIGN PATENT DOCUMENTS

| | | |
|---|---|---|
| CN | 101242573 A | 8/2008 |
| CN | 100438654 C | 11/2008 |

(Continued)

OTHER PUBLICATIONS

International Search Report in PCT Application No. PCTIUS2011/067707 mailed May 7, 2012.

(Continued)

*Primary Examiner* — Obaidul Huq

(57) ABSTRACT

A method and system for selecting a target cell for handover of user equipment in a Long Term Evolution (LTE) communication system are described. In accordance with the method, a serving cell: determines virtual channels supported by each of a plurality of neighboring cells; determines a set of virtual channels of interest to a UE; selects a subset of the neighboring cells, which supports at least one virtual channel in the set of virtual channels of interest to the UE; modifies handover behavior, and uses results of the modified handover behavior to select one of the neighboring cells, from the subset, as a target cell for handover of the UE.

20 Claims, 2 Drawing Sheets

(56) References Cited

U.S. PATENT DOCUMENTS

| | | | |
|---|---|---|---|
| 2007/0207770 A1 | 9/2007 | Ikaheimo | |
| 2008/0218209 A1 | 9/2008 | Lee | |
| 2009/0154408 A1 | 6/2009 | Jeong et al. | |
| 2009/0213800 A1 | 8/2009 | Lee | |
| 2009/0318147 A1 | 12/2009 | Zhang et al. | |
| 2010/0135206 A1 | 6/2010 | Cherian et al. | |
| 2010/0190488 A1 | 7/2010 | Jung et al. | |
| 2010/0216454 A1 | 8/2010 | Ishida et al. | |
| 2010/0240375 A1* | 9/2010 | Ahluwalia | 455/439 |
| 2010/0322069 A1 | 12/2010 | Song et al. | |
| 2011/0117916 A1* | 5/2011 | Dahlen | 455/436 |
| 2011/0188446 A1 | 8/2011 | Bienas et al. | |
| 2011/0263255 A1 | 10/2011 | Alonso-Rubio et al. | |
| 2011/0305184 A1 | 12/2011 | Hsu | |
| 2012/0002643 A1* | 1/2012 | Chung et al. | 370/331 |
| 2012/0082105 A1 | 4/2012 | Hwang et al. | |
| 2012/0196543 A1 | 8/2012 | Andersson et al. | |

FOREIGN PATENT DOCUMENTS

| | | |
|---|---|---|
| CN | 100466812 C | 3/2009 |
| EP | 1959617 A1 | 8/2008 |
| WO | 2005006829 A2 | 1/2005 |
| WO | 2008137354 A1 | 11/2008 |
| WO | 2009053933 A1 | 4/2009 |
| WO | 2009096833 A1 | 8/2009 |
| WO | 2010054391 A2 | 5/2010 |
| WO | 2011157216 A1 | 12/2011 |

OTHER PUBLICATIONS

Nokia et al: "Enabling techniques for MBMS service continuity", 3GPP TSG-RAN WG 2 Meeting #58bis; R2-072415—Jun. 2007.

Motorola: MBMS Session Start and UE mobility between MBSFN and PTM, 3GPP TSG-RAN EG2#60; R2-074648—Nov. 2007.

Mediatek: "MBMS reception status report for service continuity",3GPP TSG-RAN2 #75 Meeting; R2-114197—Aug. 2011.

Mediatek: "MBMS SC in connected mode", 3GPP TSG-RAN2 #75 Meeting; R2-115220—Oct. 2011.

PCT International Search Report and Written Opinion for Application No. PCT/US2011/050483 dated Dec. 16, 2011.

PCT International Search Report and Written Opinion for Application No. PCT/US2011/067710 dated Apr. 16, 2012.

PCT International Search Report and Written Opinion for Application No. PCT/US2012/067692 dated Jun. 29, 2012.

"Universal Mobile Telecommunications System (UMTS): LTE; Multimedia Broadcast/Multicast Service (MBMS); Architecture and Functional Description (EGPP TS 23.246 Version 9.5.0 Release 9)", Technical Specification European Telecommunications Standards Institute (ETSI), France, Jun. 1, 2010; vol. 3GPP SA 2, No. V9.5.0; XP014047180.

"3rd Generation Partnership Project:Technical Specification Group Services and System Aspects: 3GPP Enablers for Open Mobile Alliance (OMA); Push-To-Talk Over Cellular (POC) Services; Stage 2, Release 9", Mobile Conference Centre, France, Dec. 11, 2009, pp. 1-38; XP050400718.

Non-Final Office Action mailed Mar. 14, 2013 in U.S. Appl. No. 12/982,208, Valentin Oprescu-Surcobe, filed Dec. 30, 2010.

International Preliminary Report on Patentability and Written Opinion for International Patent Application No. PCT/US2011/067710 issued Jul. 2, 2013.

Notice of Allowance mailed Feb. 6, 2012 in U.S. Appl. No. 12/981,923, Valentin Oprescu-Surcobe, filed Dec. 30, 2010.

International Preliminary Report on Patentability and Written Opinion for International Patent Application No. PCT/US2011/067707 issued Jul. 2, 2013.

Notice of Allowance mailed Jun. 14, 2013 in U.S. Appl. No. 12/894,403, Valentin Oprescu-Surcobe, filed Sep. 30, 2010.

Non-Final Office Action mailed Dec. 7, 2012 in U.S. Appl. No. 12/894,403, Valentin Oprescu-Surcobe, filed Sep. 30, 2010.

International Preliminary Report on Patentability and Written Opinion for International Patent application No. PCT/US2011/050483 issued Apr. 2, 2013.

* cited by examiner

US 9,473,994 B2

METHOD AND SYSTEM FOR SELECTING A TARGET CELL FOR HANDOVER OF USER EQUIPMENT IN A LONG TERM EVOLUTION SYSTEM

REFERENCE TO RELATED APPLICATIONS

The present application is related to the following U.S. applications commonly owned together with this application by Motorola, Inc.:

Ser. No. 12/981,923, filed Dec. 30, 2010, titled "Methods for Mobility Management of User Equipment in a Long Term Evolution System" by Oprescu, et al., and issued as U.S. Pat. No. 8,195,166; and Ser. No. 12/982,208, filed Dec. 30, 2010, titled "Method for Managing Resource Utilization in a Long Term Evolution Communication System" by Oprescu, et al., and published as U.S. patent application no. 2012/0170552.

TECHNICAL FIELD

The technical field relates generally to communication systems and more particularly to selecting a target cell for handover of user equipment in a Long Term Evolution communication system.

BACKGROUND

Long Term Evolution (LTE) is a radio technology designed to increase the capacity and speed of mobile telephone networks and provides for an end-to-end Internet Protocol (IP) service delivery of media. Currently, LTE comprises a set of enhancements to the Universal Mobile Telecommunications System (UMTS), which is described in a suite of Technical Specifications (TS) developed within and publicized by $3^{rd}$ Generation Partnership Project (3GPP), with the most recent version of the 3GPP TSs being published in September 2010.

LTE, in part, provides for a flat IP-based network architecture designed to ensure support for, and mobility between, some legacy or non-3GPP systems such as, for instance, GPRS (general packet radio service) and WiMAX (Worldwide Interoperability for Microwave Access). Some of the main advantages with LTE are high throughput, low latency, plug and play, FDD (frequency-division duplexing) and TDD (time-division duplexing) in the same platform, improved end user experience, simple architecture resulting in low operating costs, and interoperability with older standard wireless technologies such as GSM (Global Systems for Mobile Communications), cdmaOne™, W-CDMA (UMTS), and CDMA2000®.

Many major carriers in the United States (US) and several worldwide carriers have started to convert their networks to LTE. In addition, public safety agencies in the US (including US Intelligence Services) have endorsed LTE as the preferred technology for the new 700 MHz public safety radio band.

Due to the mission critical nature of public safety, it is important that user equipment (UE) operated by public safety personnel maintain service continuity while moving throughout the LTE system. More particularly, when a UE undergoes a handover from one cell to another cell, as the UE moves in the LTE system, it is essential that the UE move to a cell that supports the UE's current channel (for continuity of service) or at a minimum supports at least one channel of interest to the UE. However, this is not always possible in current LTE systems.

Current LTE systems typically contain numerous cells covering multiple geographical areas, with many of these cells supporting different groups of channels. Current mechanisms of selecting a cell for UE handover utilize signal strength measurements, wherein, for example, the cell with the strongest signal could be selected as a target for handover. However, this is not sufficient to guarantee continuity of service since the strongest signal does not necessarily come from a cell that carries or is capable of carrying a channel of interest for a given UE; and, in the case of Multimedia Broadcast Multicast Service (MBMS) channels, the selected cell may not even support the channel on which the UE is active or any channels of interest to the UE, for that matter.

Thus, there exists a need for a method and system for selecting a target cell for handover of UE in an LTE system.

BRIEF DESCRIPTION OF THE FIGURES

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
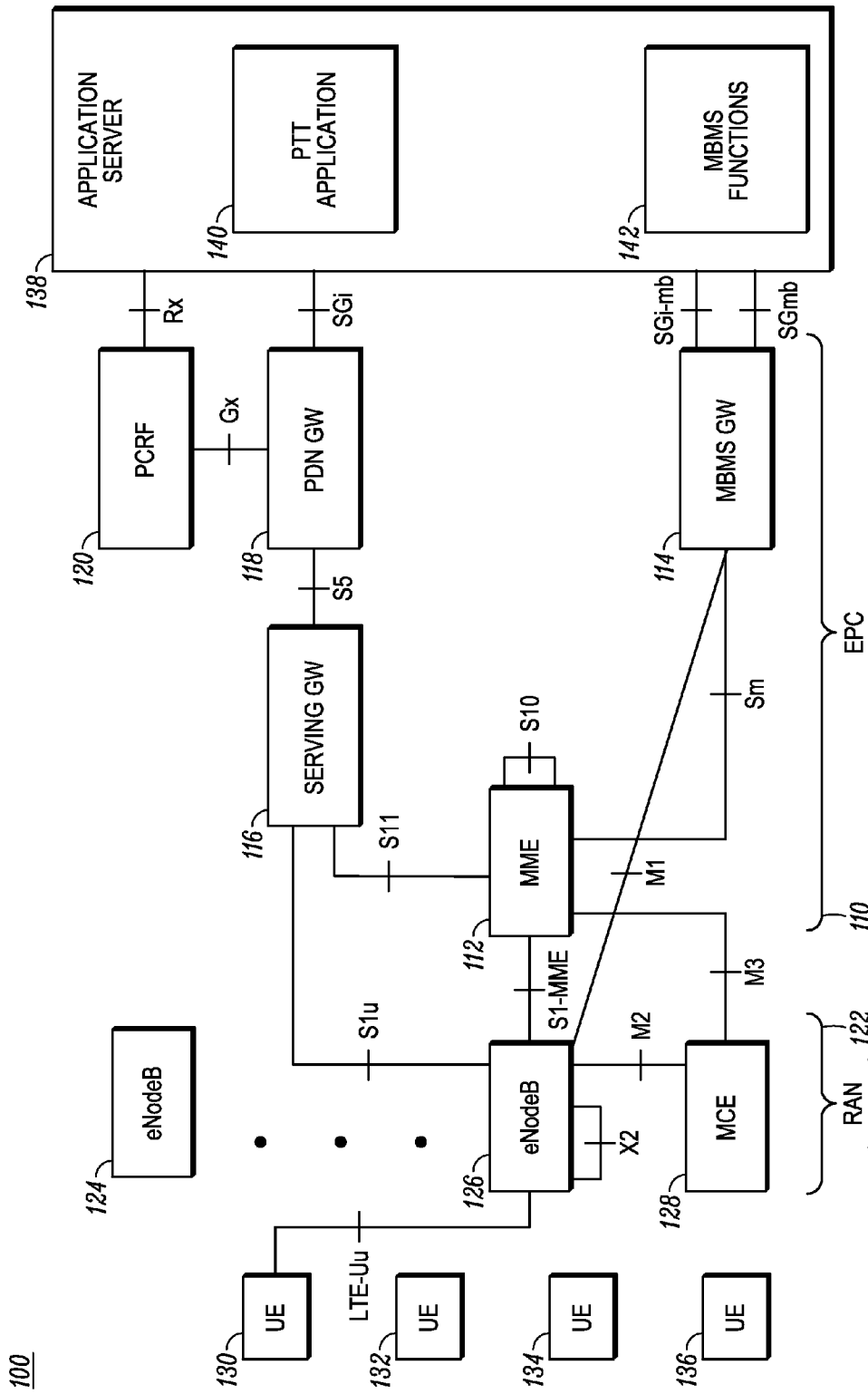
FIG. 1 is a system diagram of a communication system that implements methods for selecting a target cell for handover of UE in an LTE system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required. Apparatus and method components have been represented, where appropriate, by conventional symbols in the drawings, showing only those specific details that are pertinent to understanding the various embodiments so as not to obscure the disclosure with details that will be readily apparent to those of ordinary skill in the art, having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

Generally speaking, pursuant to an embodiment, a serving cell: determines virtual channels supported by each of a plurality of neighboring cells; determines a set of virtual channels of interest to a UE; selects a subset of the neighboring cells, which supports at least one virtual channel in the set of virtual channels of interest to the UE; modifies handover behavior, and uses results of the modified handover behavior to select one of the neighboring cells, from the subset, as a target cell for handover of the UE.

Using the various teachings herein, some advantages include: a reduction in the amount of signaling involved at the UE and the eNodeB by preventing radio frequency (RF) measurement reporting of eNodeB and resultant handover to the eNodeB, which do not support channels of interest to the UE; a reduction in the chances of dropping a channel during a talk spurt; and an extension of battery life in a UE by preventing useless RF measurements of eNodeBs that are not true candidates for handover for the served UE. Those skilled in the art will realize that the above recognized advantages and other advantages described herein are merely illustrative and are not meant to be a complete rendering of all of the advantages of the various embodiments.

Referring now to the drawings, and in particular FIG. 1, a communication system in accordance with some embodiments is shown and indicated generally at 100. System 100 includes system elements of: an LTE Evolved Packet Core (EPC) 110 having a number of logical elements (including a Mobility Management Entity (MME) 112, a Multimedia Broadcast Multicast Service Gateway (MBMS GW) 114, a Serving Gateway (SGW) 116, a Packet Data Network Gateway (PDN GW) 118, and a Policy and Charging Rules Function (PCRF) 120); an access network (in this case a radio access network (RAN)) 122 that includes a plurality of eNodeB (LTE base station) infrastructure devices 124 and 126 and a Multicast Control Entity (MCE) 128; a plurality of UE 130, 132, 134, and 136; and an application server (AS) 138 shown, for illustration and not as a limiting factor, as having logical entities of a Push-to-Talk application 140 and MBMS functions 142. In general, the EPC and the RAN are referred to collectively as the LTE system. The elements of communication system 100 and the interfaces between them are further described below.

The RAN 122 elements, EPC 110 elements, application server 138, and UE 130 to 136 implement protocols and signaling in accordance with 3GPP TSs; and the terms LTE communication system, LTE system, and Evolved Packet System (EPS) are used interchangeably herein and are each defined as being inclusive of the RAN 122 and the EPC 110 but not inclusive of the application server 138 or the UE. By contrast, the application server 138 is included in a network of a service provider for the UE, and communications between the application server 138 and the UE are facilitated using the LTE system. Moreover, only a limited number of EPC elements and UE, and one application server and RAN are shown in the diagram, but more such elements may be included in an actual commercial or private system implementation; and only one UE is shown connected to an eNodeB, and one eNodeB is shown connected to the EPC for ease of illustration. Also, the RAN can be any type of access network, including any 2G, e.g., GSM, or 3G, e.g., UMTS, access network.

In general, the UE, the application server 138, the EPC 110 logical elements, and the RAN 122 elements are each implemented using (although not shown) a memory, one or more network interfaces, and a processing device that are operatively coupled, and which when programmed form the means for these system elements to implement their desired functionality, for example as illustrated by reference to the method shown in FIG. 2. The network interfaces are used for passing signaling, also referred to herein as messaging, (e.g., messages, packets, datagrams, frames, superframes, and the like) between the elements of the system 100. The implementation of the network interface in any particular element depends on the particular type of network, i.e., wired and/or wireless, to which the element is connected.

Where the network supports wireless communications, the interfaces comprise elements including processing, modulating, and transceiver elements that are operable in accordance with any one or more standard or proprietary wireless over-the-air interfaces, wherein some of the functionality of the processing, modulating, and transceiver elements may be performed by means of the processing device through programmed logic such as software applications or firmware stored on the memory device of the system element or through hardware.

The processing device utilized by the UE, the application server 138, the EPC 110 logical elements, and the RAN 122 elements may be programmed with software or firmware logic or code for performing functionality described by reference to FIG. 2; and/or the processing device may be implemented in hardware, for example, as a state machine or ASIC (application specific integrated circuit) to perform such functionality. The memory implemented by these system elements can include short-term and/or long-term storage of various information needed for the functioning of the respective elements. The memory may further store software or firmware for programming the processing device with the logic or code needed to perform its functionality.

We now turn to a brief description of the functionality of the system elements shown in FIG. 1, which will aid in the understanding of the later description of the method illustrated in FIG. 2. The UE 130, 132, 134, and 136, which are also referred to in the art as subscribers, communication devices, access devices, access terminals, mobile stations, mobile subscriber units, mobile devices, user devices, and the like, can be any type of communication device such as radios, mobile phones, mobile data terminals, Personal Digital Assistants (PDAs), laptops, two-way radios, cell phones, and any other device capable of operating in a wired or wireless environment and that can be used by public users (such as consumers) or private users (such as public safety users).

When a UE attaches to the LTE system, via the RAN, it is connected to the appropriate core network (i.e., MME, SGW, and PDN GW) based on an identity of a service provider sent by the UE. Mobility management for UE is classified based on the radio technologies of source (i.e., serving) and candidate or target LTE cells and the mobility-state of the UE, wherein a cell is defined as being inclusive of a single eNodeB's coverage area or a portion of an eNodeB's coverage area and can be identified by a cell identifier. Pursuant to this understanding of the relationship between cells and eNodeBs, within this text, the terms "cell" and "eNodeB" may be used on occasion interchangeably, without loss of clarity. In addition, the abbreviation eNB may be used in lieu of eNodeB.

From a mobility perspective, the UE can be in one of three states, DETACHED, IDLE, and ACTIVE. The DETACHED state is defined as a transitory state in which the UE is powered-on but is in the process of searching for and registering with the LTE system.

The ACTIVE state is defined as a state in which the UE is registered with the LTE system and has an RRC (radio resource control) connection with an eNodeB or cell. Thus, a UE is deemed to have an "LTE connection" when the UE is in an ACTIVE state and has an RRC connection with a cell, and when the UE to MME signaling connection has been established. In this ACTIVE state, the LTE system knows the cell to which the UE belongs and can receive/transmit data to and from the UE over bearer resources dedicated to the UE. Also, in the ACTIVE state, when a UE moves between two LTE cells, "backward" handover or predictive handover is carried out. In this type of handover, the serving cell, based on RF measurement reports from the UE, determines a target cell and queries the target cell if it has enough bearer resources to accommodate the UE. The target cell also prepares bearer resources before the serving cell commands the UE to handover to the target cell. In an LTE system, it is the responsibility of the current (or serving) cell to instruct the UE to send RF measurement reports and based on these reports, to prepare a target cell to accept the UE, and finally to hand the UE over to the target cell.

Accordingly, as the terms are used herein, a handover is defined as a transition of a UE's LTE connection from a serving cell to a target cell, or a movement of a UE from one cell to a target cell to establish an LTE connection. A serving cell is defined as a cell to which a UE has a current LTE connection. A candidate cell is defined as a potential target cell for handover of the UE. A target cell is the actual cell selected for handover of a given UE. A neighboring cell is a cell having an adjacent geographic coverage area to a UE's serving cell.

The IDLE state is defined as a power-conservation state for the UE, where the UE is not transmitting or receiving packets on a dedicated or default bearer but can receive MBMS service. In the IDLE state, no context about the UE is stored in the eNodeB, and the location of the UE is only known at the MME and only at the granularity of a tracking area (TA) that may include multiple eNodeBs. The MME knows the TA in which the UE last registered, and paging is necessary to locate the UE to a cell.

The application server 138 is an infrastructure device that supports applications (executed in a processing device) or provision of services to UE over the LTE system. Such applications include, but are not limited to, PTT services, PTV (Push-to-Video) services, PTX (push-to-anything) services via unicast or multicast. The multicast can be delivered through an EPS by way of unicast service or MBMS Service. In an embodiment, the application server 138 is an infrastructure element of a Public Land Mobile Network (PLMN) of a public safety agency to which the UE have access. As such, the application server may be, for instance, a computer aided dispatch (CAD) server, a media server, a call controller, etc. As illustrated, the application server 138 could include the PTT application 140 and, if broadcast/multicast is used for delivery, the MBMS functions 142. The PTT application 140 facilitates media delivery to the UE that have PTT capabilities. The MBMS functions 142, which are typically associated with a Broadcast-Multicast Service Center (BM-SC), manage MBMS services to the UE and are the source of MBMS traffic. The MBMS functions 142 include, for example, authorization for terminals requesting to activate a MBMS service, scheduling of broadcast and multicast services, integrity and confidentiality protection of MBMS data, MBMS session announcement, and serving as an entry point for content providers or any other broadcast/multicast source that is external to the LTE system. Moreover, although MBMS point-to-multipoint (PTM) functions 142 are illustratively shown, the application server 138 can, alternatively, be configured with any suitable PTM (e.g., broadcast and/or multicast) capabilities.

The EPC 110 is an all-IP core network that provides mobile core functionality that, in previous mobile generations (2G, 3G), has been realized through two separate sub-domains: circuit-switched (CS) for voice and packet-switched (PS) for data. The EPC 110 enables the above-mentioned all IP end-to-end delivery of media: from mobile handsets and other user equipment with embedded IP capabilities, over IP-based eNodeBs, across the EPC and throughout the application domain, IMS (IP Multimedia Subsystem) and non-IMS.

As mentioned above, The EPC 110 comprises the logical components of the MME 112, the MBMS GW 114, the SGW 116, the PDN GW 118, and the PCRF 120 and further comprises the, respective, interfaces (also referred to in the art as reference points) between these logical entities. The logical entities of the EPC 110 are shown as separate logical blocks and indeed can, in some embodiments, each be included in separate hardware devices or can, alternatively, be combined in one or more hardware devices. Also, the EPC 110, depending on the size of the network, may have several such components serving thousands or tens of thousands of UE and serving many application servers. Additional known elements and interfaces in an EPC as described in the 3GPP TSs for LTE that are needed for a commercial or private embodiment of the EPC 110 are not shown in FIG. 1 for the sake of clarity.

Turning first to the MME 112, this EPC element is the key control-node for UE access on the LTE system. It is responsible for IDLE mode UE tracking and paging procedures, including retransmissions. It is involved in the bearer activation/deactivation process and is also responsible for choosing the SGW for a UE at the initial attach and at time of intra-LTE handover involving Core Network (CN), i.e., MME, SGW, PDN GW, node relocation. The MME 112 is responsible for authenticating the user (by interacting with an HSS, not shown). Non-Access Stratum (NAS) signaling generated using a NAS protocol terminates at the MME 112, and the MME 112 is also responsible for generation and allocation of temporary identities or identifiers to UE. The MME 112 further checks the authorization of the UE to camp on the service provider's PLMN and enforces UE roaming restrictions.

In the control-plane, the NAS protocol, which runs between the MME 112 and the UE, is used for control-purposes such as network attach, authentication, setting up of bearers, and mobility management. Unlike in other systems, in LTE the allocation and maintenance of bearers is independent of the connection state of the UE, in the sense that a UE may be connected and not have bearers allocated to it and conversely, a UE may be idle but have allocated bearers.

As used herein, the term bearer or bearer resource is defined as a transmission path in a network (such as a RAN) and is used to carry UE data traffic (also termed, herein, as communications or service data flows (SDFs)). An EPS bearer is defined as a bearer that extends between the UE and the PDN GW and encompasses both a wireless path (UE to eNodeB), as well as a network transport path (eNodeB to PDN GW). A bearer can be bidirectional, i.e., having both an uplink path from the UE to the application server and a downlink path from the application server to the UE; or a bearer can be unidirectional, such as a common point-to-multipoint (PTM) downlink path from the application server to the UE for MBMS traffic.

A bearer can be point-to-point (PTP) (such as a unicast bearer), or a PTM bearer (such as a MBMS bearer) and has associated therewith a set of characteristics or attributes including, but not limited to, Quality of Service (QoS), a carrier frequency at which data is modulated, a particular bandwidth, bit rate, etc. A default bearer is defined as a non-GBR (guaranteed bit rate) bearer that provides for "best effort" SDF transmission and is allocated to a UE for the duration of its attachment to the LTE system and need not be explicitly requested. A dedicated bearer is defined as any additional bearer that is established for the same UE and is specifically requested by (or on behalf of) a UE and can be either non-GBR or GBR.

The MBMS GW 114 is an entry point in the LTE system, and it distributes MBMS traffic to all eNodeBs within MBMS service areas. MBMS may use Single Frequency Network (SFN) transmission, also referred to as MBSFN. In MBSFN, the transmission happens from a time-synchronized set of eNodeBs in the service area, using the same resource blocks. IP multicast can be used for distributing the traffic from the MBMS GW 114 to the different eNodeBs. The MCE 128 in the RAN 122 ensures that the same resource blocks are allocated for a given service across all the eNodeBs of a given MBSFN area. It is the task of the MCE 128 to ensure that RLC (Radio Link Control)/MAC (Media Access Control) layers at the eNodeBs are appropriately configured for MBSFN operation.

The SGW 116 routes and forwards user point-to-point data packets, while also acting as the mobility anchor for the user plane during inter-eNodeB handovers and as the anchor for mobility between LTE and other 3GPP technologies.

The PDN GW 118 provides connectivity to the UE to external packet data networks (PDNs) by being the point of exit and entry of traffic for the UE. A UE may have simultaneous connectivity with more than one PDN GW for accessing multiple PDNs. The PDN GW 118 performs policy enforcement, packet filtering for each user, charging support, lawful interception and packet screening. Another key role of the PDN GW 118 is to act as the anchor for mobility between 3GPP and non-3GPP technologies such as WiMAX and 3GPP2 (CDMA 1x and EvDO). The PCRF 120 provides policy and charging rules to the PDN GW to support its SDF detection, policy enforcement, and flow-based charging functions.

RAN 122 in this embodiment is a E-UTRAN (Evolved UMTS Terrestrial Radio Access Network) comprising multiple cells each served by an eNodeB, e.g., 124, 126, which serve as the intermediate infrastructure device between the UE and the EPC 110 and a point of access for the UE to allocated bearers. Each cell represents a geographic coverage area that provides the wireless resources termed herein as bearers for carrying data (or SDFs) for UE connected to the RAN. An RRC layer in the eNodeB makes handover decisions based on neighbor cell RF measurement reports sent by the UE, pages for the UE over the air, broadcasts system information, controls UE RF measurement reporting such as the periodicity of Channel Quality Information (CQI) reports, and allocates cell-level temporary identifiers to active UE. The RRC layer also executes transfer of UE context from the serving cell to the target cell during handover, and does integrity protection of RRC messages. In addition, the RRC layer is responsible for the setting up and maintenance of EPS bearer resources.

Regarding the LTE reference points, the UE communicates its signaling with an eNodeB via an LTE-Uu reference point. An S1-MME reference point is used for the control plane protocol (e.g., eRANAP which uses Stream Control Transmission Protocol (SCTP) as the transport protocol) between the E-UTRAN (e.g., via the eNodeB 126) and the MME 112. An S1u reference point between the eNodeB 126 (E-UTRAN) and the SGW 116 is used for the per-bearer user plane tunneling and inter-eNodeB path switching during handover, wherein the transport protocol over this interface is GPRS Tunneling Protocol-User plane (GTP-U). An X2 reference point is used for inter-eNodeB communications.

An S5 reference point provides user plane tunneling and tunnel management between the SGW 116 and the PDN GW 118 and is used for SGW relocation due to UE mobility and if the SGW needs to connect to a non-collocated PDN GW for the required PDN connectivity. Both GTP and IETF (Internet Engineering Task Force) based Mobile IP protocols are used over this interface.

A Gx reference point provides transfer of QoS policy and charging rules from the PCRF 120 to a Policy and Charging Enforcement Function (PCEF, not shown) in the PDN GW 118. An Rx reference point resides between the PCRF 120 and an Application Function (AF, not shown) in the application server 138 for control signaling. An S10 reference point resides between MMEs for MME relocation and MME to MME information transfer. An S11 reference point resides between the MME 112 and SGW 116 for corresponding signaling.

An SGi reference point resides between the PDN GW 118 and a packet data network (in this case a PDN that includes the application server 138), such as an operator-external public or private PDN or an intra-operator PDN, e.g., for provision of IMS services. The SGi reference point corresponds to a Gi reference point for 2G/3G accesses.

For supporting the PTM signaling provided by MBMS (in this illustrative embodiment), an SG-mb reference point between the MBMS GW 114 and the application server 138 supports MBMS bearer signaling for setting up and releasing context at MBMS session establishment and termination and also may support user related signaling, e.g. for Multicast session authorization, or user session joining or detach. An SGi-mb reference point between the MBMS GW 114 and the application server 138 supports the MBMS traffic plane. An M1 reference point between the MBMS GW 114 and the eNodeB 126 makes use of an IP multicast protocol for the delivery of packets to eNodeBs. The traffic plane "payload" is encapsulated in SYNC protocol data units (PDUs). An M2 reference point between the eNodeB 126 and the MCE 128 is used by the MCE 128 to provide the eNodeB with radio configuration data. An M3 reference point between the MME 112 and the MCE 128 supports the MBMS session control signaling, e.g. for session initiation and termination. An Sm reference point provides for communications between the MBMS GW 114 and the MME 112 to support the PTM services.

A PTM bearer is generally associated with a service and is identified via a Temporary Mobile Group Identity (TMGI). Between the eNodeB and the UE, the PTM bearer takes the form of a Multicast Traffic Channel (MTCH), with the traffic associated to a specific TMGI being carried by a specific MTCH at any given time. Within a MBSFN area, several MTCHs being transmitted with the same modulation and coding levels can be grouped in one MCH transport channel. Common signaling is carried out at both the RRC layer (e.g. the MTCH control channel) and at the MAC layer.

As used herein, the term virtual channel (VC) means an identifiable information flow between a media source and a set of target UE associated with the virtual channel. In general, it is possible to have several virtual channels active at the same time in a service area. A virtual channel can be seen as a logical representative of a communication service and/or the group of users to which the information flow is addressed, e.g., a talkgroup. To receive the desired content, the UE must identify and decode a downlink bearer to which the virtual channel is mapped. If one or more MBMS PTM bearers are used for a virtual channel, each bearer may consist of an MTCH and the associated portions of the RAN and of the EPC bearers that traverse the SGi-mb and M1 interfaces. A UE can be a content source for a virtual channel by using an uplink bearer associated with (or mapped to or for) a virtual channel to send media to an application server; or the UE can receive content on a virtual channel over a unicast PTP or broadcast PTM downlink bearer for the virtual channel. As used herein, an active virtual channel means a virtual channel having current transmissions (activity), e.g., voice, video, text, etc. (collectively referred to herein as "data" or "media" or "traffic"), on one or more of the bearers for the virtual channel. By contrast, an inactive virtual channel means a virtual channel in which no transmissions have occurred on any of the associated bearers for the virtual channel for a time period exceeding a known time threshold.

Figure 2:
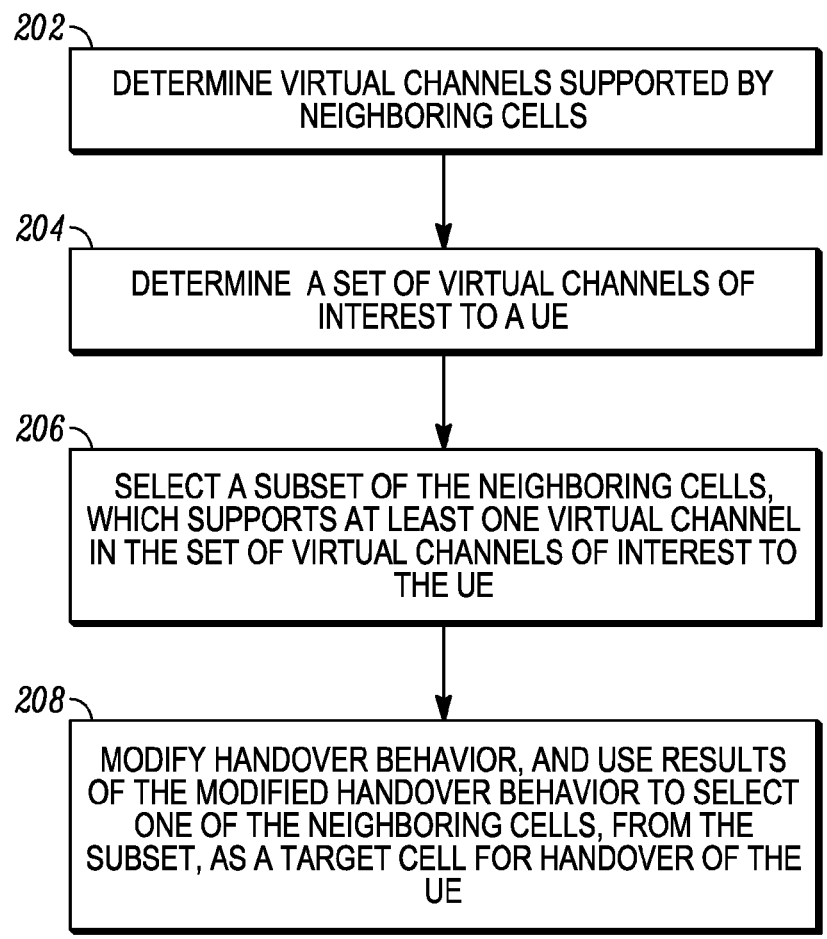
FIG. 2 is a flow diagram illustrating a method performed by a serving cell for selecting a target cell for handover of UE in an LTE system.

Turning now to FIG. 2, a flow diagram illustrating a method for selecting a target cell for handover of a UE in a LTE system is shown and generally indicated at 200. The functionality illustrated by method 200 is performed in a serving cell (eNodeB) in the RAN. For implementation of method 200, it is assumed that a UE (e.g., UE 130) has an LTE connection to a serving cell (e.g., eNodeB 126) and is in an ACTIVE state (since eNodeBs are generally not aware of UE in the IDLE state), such that the serving cell can provide access to bearers that support one or more virtual channels of interest to the UE and such that the serving cell can perform handover procedures for the connected UE.

In general a serving cell "knows" (e.g., has stored therein) an internal listing of the MTCHs transmitted within the MBSFNs that it supports; and the serving cell is also configured with software to map supported virtual channels to their MTCHs, based on information received from the application server. In accordance with method 200, the serving cell also determines (202) virtual channels supported by each of a plurality of its neighboring cells. This "plurality" of neighboring cells considered by the serving cell may include all of the neighboring cells for the serving cell, but more likely only includes some of the neighboring cells of the serving cell.

The serving cell "determines" or otherwise obtains knowledge of the virtual channels supported by its neighboring cells via pre-configuration, UE reports, notifications from an infrastructure element such as the application server, notifications from its neighboring cells, any other suitable method, or a combination of these methods. Depending on the particular implementation, the virtual channels supported by the neighboring cells can be provided to the serving cell from the UE, the infrastructure, and/or the neighboring cells using any suitable messaging such as messages, information elements and/or fields within packets, datagrams, etc., already being communicated between the serving cells and these other entities. In particular, such provision of information could be provided by extending the mechanisms used in Self-Optimizing Networks (SONs) approaches.

For example, measurement reports that one or more UE sends to the serving cell could be enhanced to include information about virtual channels supported by neighboring cells to which the measurement reports refer. Also, during handover of a UE from a previous cell to the serving cell, the previous cell might provide to the serving cell the virtual channels supported by the previous cell and one or more other neighboring cells. In addition, cells may be programmed to, on some periodic or non-periodic basis, provide to a group of neighboring cells the virtual channels supported at the cell. This signaling could occur as messaging on the X2 interface between eNodeBs. Other mechanisms for providing information regarding virtual channels supported at neighboring cells can be envisioned within the context of the teachings herein.

Returning to method 200 of FIG. 2, at 204, the serving cell determines a set (of one or more) virtual channels "of interest" to the UE, wherein the virtual channels of interest to the UE are defined as, at least, the one or more virtual channels, wherein the UE is authorized to decode and view or listen to the traffic sent on the virtual channel and/or authorized to send traffic on the virtual channel. The UE is configured with its virtual channels of interest and may be further configured with identifiers for these virtual channels (e.g., talkgroup identifiers). In one illustrative implementation, the serving cell receives one or more messages from the UE or the application server indicating the set or list of virtual channels of interest to the UE, which can be in the form of a list of virtual channel identifiers, and/or a list of virtual channels, and/or the eNodeBs and MBSFNs supporting those virtual channels, for instance. Since the UE always has access to a default bearer while connected to the LTE system, the message indicating the UE's virtual channels of interest can be sent over the default bearer. However, a dedicated bearer allocated to the UE could also be used for this purpose.

Depending on the security requirements of the communication system, the UE or the application server sends the list of the UE's virtual channels of interest in the clear to the serving cell or the list is encrypted over the air by the UE and decrypted by the serving cell. In addition, in one implementation, the UE sends the messages comprising the list of its virtual channels of interest directly to the serving cell for decoding. However, this may necessitate the serving cell having to decode or "look inside" more packets than is necessary to obtain the information regarding the UE's virtual channels of interest, thereby, using excessive processing resources in the serving cell. In an alternative implementation, which reduces the processing requirements at the serving cell but that may consume slightly more RF resources in the network and more time, the messages containing the indication of the UE's virtual channels of interest are forwarded to the application server, decoded there, and then sent to the serving cell using any suitable messaging.

In terms of the timing of the UE sending to the serving cell the messages containing its virtual channels of interest, the UE can send these messages based on certain triggers (e.g., at cell reselection or handover) or on some periodic basis. For example, in a LTE implementation, if a UE in an ACTIVE state fails to generate activity on its assigned or allocated bearers for some length of time (e.g., ten seconds), the serving cell initiates a process to tear down the UE's LTE connection. Therefore, to maintain its LTE connection, the UE may transmit a packet, termed herein a "keep alive" message, at least once every few seconds (e.g., at least once every less than ten seconds) to the serving cell, which causes the serving cell to withhold disconnecting the UE from the LTE system. In accordance with embodiments of the disclosure, the UE may piggyback its list of virtual channels of interest on one or more of these keep alive messages or may send the information in stand-alone messages. In one example implementation, the information included in the messages, comprises at least an identity of one or more virtual channels of interest (one byte or a four byte bitmap pointing to the set of virtual channels for which the UE is configured), an identifier for the information, and (if necessary) the UE identifier.

In addition, the set of virtual channels of interest to the UE could include one or more virtual channels, determined by the serving cell, to be ones on which the UE has transmitted or received media. This can be tracked by the serving cell while the UE is LTE connected to the serving cell or provided by the UE or the application server on handover of the UE from a previous cell to the serving cell.

The serving cell uses the information obtained from functionality 202 and 204 to select (206) a subset of the neighboring cells, which supports at least one virtual channel in the set of virtual channels of interest to the UE. This subset of the neighboring cells is used, for instance, from which to select a target cell for handover. Thus, the subset comprises a set of candidate or potential cells for handover of the UE because each cell in the subset supports at least one virtual channel of interest to the UE.

In some illustrative implementations, the selection of the subset of candidate neighboring cells for potential handover of the UE is based on whether the UE is transmitting or receiving on a given virtual channel or whether there is activity on any of the virtual channels of interest to the UE. For example, when the UE is active on a virtual channel, such as by transmitting on an uplink bearer associated with the virtual channel or receiving on a downlink channel associated with the virtual channel, the serving cell includes in the candidate subset of neighboring cells all of the cells (in the plurality of neighboring cells under consideration by the serving cell) that support that particular virtual channel.

If none of the neighboring cells supports the virtual channel having activity, the serving cell has a couple of options. First, the serving cell could include in the subset of neighboring cells, one or more cells that support a different virtual channel of interest for the UE. Alternatively, if the transmission area (and the associated MBSFN) is extendable, the serving cell could add or initiate adding a new neighboring cell, which the serving cell then includes in the subset of candidate neighboring cells that supports the virtual channel of interest having activity or that supports at least one virtual channel of interest to the UE. It should be noted that this option of adding new neighboring cells is available for use in other scenarios as well where there are no neighboring cells that support any of a UE's virtual channels of interest or that support a particular virtual channel of interest that is currently active. Furthermore, where the serving cell determines that all of the virtual channels of interest to the UE are inactive, the serving cell includes in the subset of candidate neighboring cells all of the cells (from the plurality of neighboring cells being considered) that support any of the virtual channels of interest to the UE including any neighboring cells added to the service area.

In the case of virtual channels mapped to MBMS PTM bearers, the addition of new cells to a service area (or the converse operation of their removal) could be achieved, by making the new cells part of (and respectively removing them from) the multicast group used by the MBMS GW to distribute traffic for the formation of the MBSFN. The new cells would have to start the same services and sessions corresponding to the same virtual channels of interest as their neighbors already participating in the MBSFN. It may turn out, that in order to get enough RF coverage through the extended MBSFN, adjacent cells (to the new cells) may also need to be activated in this fashion.

Once the subset of candidate neighboring cells is selected, the serving cell modifies (208) handover behavior and uses the results of the modified handover behavior to select one of the neighboring cells, from the subset, as a target cell for handover of the UE. In the context of this disclosure, modifying handover behavior means modifying standard handover procedures, wherein standard handover procedures are further defined as handover procedures that are performed in accordance with and as described in the 3GPP TSs.

In accordance with the teachings herein, the serving cell can modify (or cause to be modified) its own handover behavior or that of the UE, and then use the results of the modified handover behavior to select the target cell. In one example implementation, modifying the handover behavior comprises the serving cell considering only the measurement reports of the neighboring cells from the subset of candidate cells when selecting the target cell. In standard LTE, the UE uses conventional means to measure signal strength of signals of all neighboring cells from which it can detect a signal, and sends these reports (i.e., the RF measurement reports) to the serving cell. However, in accordance with the teachings herein, when acting on received measurement reports or load balancing requests from the MME, the serving cell ignores the measurement reports for any neighboring cells outside of the subset of candidate cells so as not to order a handover to these cells.

In accordance with another example implementation, modifying the handover behavior comprises the serving cell setting RF measurement reporting parameters to facilitate faster handovers to only those cells within the candidate subset, wherein the reporting parameters are defined as one or more parameters that control the frequency (how often) or whether the UE sends measurement reports for all or selected ones of the neighboring cells. Accordingly, the serving cell could set the reporting parameters to cause the UE to sample and report signal strength (to be received at the serving cell) more often for the cells in the candidate subset than for any of the other neighboring cells. In some instances, the serving cell might direct the UE to withhold sending measurement reports for the cells outside of the candidate subset altogether (for at least some amount of time) if, for instance, the LTE system has a level of congestion above a threshold.

In accordance with another example implementation, modifying the handover behavior comprises functionality of the serving cell when the UE is not transmitting. Upon determining that the UE is connected but not transmitting, the serving cell releases the UE from its LTE connection (e.g., by sending an RRCConnectionRelease message) and may send a notification to a selected target cell from the candidate subset of cells, wherein the target cell is selected based on any one or more criteria including, but not limited to, the cell having the highest signal strength, a preferred order of the virtual channels of interest to the UE, a cell supporting the most active virtual channels of interest to the UE, a cell supporting any active channels of interest to the UE, a cell supporting a maximum number of channels of interest to the UE regardless of whether or not the virtual channels are active, or some other suitable criteria or combination of criteria; and the selected target cell (as described above) could have been added as part of an extendable transmission area.

Moreover, further in accordance with the present disclosure, when releasing the UE the serving cell may redirect the UE to the selected target cell for a subsequent LTE connection to ensure that the UE connects to a cell that supports at least one virtual channel of interest to the UE. Such redirection can be by way of an indication of the target cell identifier in the connection release message or some other suitable message or release order, in lieu of a handover order.

Moreover, when acting as the source cell for a handover or redirection, the serving cell can indicate to the target cell and/or one or more of the other neighboring cells, the virtual channels of interest to the UE.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and apparatus for managing resource utilization in a LTE communication system described herein. The non-processor circuits may include, but are not limited to, a radio receiver, a radio transmitter, signal drivers, clock circuits, power source circuits, and user input devices. As such, these functions may be interpreted as steps of a method to perform managing resource utilization in a LTE communication system described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a non-transient computer-readable storage element or medium having computer readable code stored thereon for programming a computer (e.g., comprising a processing device) to perform a method as described and claimed herein. Examples of such computer-readable storage elements include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for selecting a target cell for handover of user equipment (UE) in a Long Term Evolution (LTE) system, the method comprising:
   a radio access network element performing:
   determining virtual channels supported by each of a plurality of neighboring cells;
   determining a set of virtual channels of interest to a UE;
   selecting a subset of the neighboring cells, which supports at least one virtual channel in the set of virtual channels of interest to the UE;
   modifying a reporting process of the UE based on the selected subset of the neighboring cells;
   based on the modified reporting process, selecting one of the neighboring cells, from the subset, as a target cell for handover of the UE.

2. The method of claim 1, wherein selecting the subset of the neighboring cells, comprises:
   determining an active virtual channel of the UE, wherein the active virtual channel is a virtual channel that is one or more of broadcast or multicast in a plurality of cells; and
   including in the subset all of the neighboring cells, from the plurality, that support the active virtual channel.

3. The method of claim 1, wherein selecting the subset of the neighboring cells, comprises:
  determining that all of the virtual channels of interest to the UE are inactive; and
  including in the subset all of the neighboring cells, from the plurality, that support any of the virtual channels of interest to the UE.

4. The method of claim 1, wherein selecting the subset of the neighboring cells comprises:
  determining an active virtual channel of the UE;
  determining that none of the neighboring cells, from the plurality, supports the active virtual channel; and
  including in the subset at least one neighboring cell, from the plurality, that supports a different virtual channel of interest to the UE.

5. The method of claim 1, wherein modifying the handover behavior comprises, when selecting the target cell, considering only radio frequency measurement reports for the neighboring cells in the subset.

6. The method of claim 1, wherein modifying the handover behavior comprises setting reporting parameters to cause the serving cell to receive radio frequency measurement reports for neighboring cells in the subset more frequently than it receives radio frequency measurement reports for the remaining neighboring cells in the plurality.

7. The method of claim 1 further comprising, on handover, indicating to the target cell the virtual channels of interest to a UE.

8. The method of claim 1 further comprising, on handover, indicating to at least a portion of the plurality of neighboring cells the virtual channels of interest to a UE.

9. The method of claim 1, wherein the set of virtual channels of interest to the UE includes at least one virtual channel determined, by the serving cell, as a virtual channel on which the UE has transmitted.

10. The method of claim 1 further comprising receiving a message from the UE that indicates the set of virtual channels of interest to the UE.

11. The method of claim 10, wherein the message from the UE is also a keep alive message to the serving cell, which causes the serving cell to withhold disconnecting the UE from the LTE system.

12. The method of claim 10, wherein the message from the UE is sent over a default or a dedicated bearer for the UE.

13. The method of claim 10, wherein the message is decoded at an application server and then sent to the serving cell.

14. The method of claim 1, wherein the target cell is selected in accordance with a preferred order of the virtual channels in the set of virtual channels of interest to the UE.

15. The method of claim 1, wherein modifying the handover behavior comprises:
  determining that the UE is not transmitting;
  releasing the UE from an LTE connection; and
  sending a notification to the target cell.

16. The method of claim 15 further comprising, the serving cell, sending a connection release message to the UE that redirects the UE to the target cell.

17. The method of claim 1, wherein the target cell was added by the serving cell as part of an extendable transmission area.

18. A radio access network element of a serving cell in a Long Term Evolution (LTE) system, the radio access network element of a comprising:
  an interface to a user equipment (UE); and
  a processing device coupled to the interface, wherein the processing device is programmed to:
    determine virtual channels supported by each of a plurality of neighboring cells;
    determine a set of virtual channels of interest to the UE;
    select a subset of the neighboring cells, which supports at least one virtual channel in the set of virtual channels of interest to the UE;
    modify a reporting process of the UE based on the selected subset of the neighboring cells;
    based on the modified reporting process, select one of the neighboring cells, from the subset, as a target cell for handover of the UE.

19. The radio access network element of claim 18, wherein the radio access network element is an eNodeB.

20. A non-transient computer-readable storage element having computer readable code stored thereon for programming a computer in a radio access network element to perform a method for selecting a target cell for handover of user equipment (UE) in a Long Term Evolution (LTE) system, the method comprising:
  determining virtual channels supported by each of a plurality of neighboring cells;
  determining a set of virtual channels of interest to a UE;
  selecting a subset of the neighboring cells, which supports at least one virtual channel in the set of virtual channels of interest to the UE;
  modifying a reporting process of the UE based on the selected subset of the neighboring cells;
  based on the modified reporting process, selecting one of the neighboring cells, from the subset, as a target cell for handover of the UE.

* * * * *